No. 682,929. Patented Sept. 17, 1901.
R. GOODLAD.
SPEED INDICATOR.
(Application filed May 10, 1901.)
(No Model.)
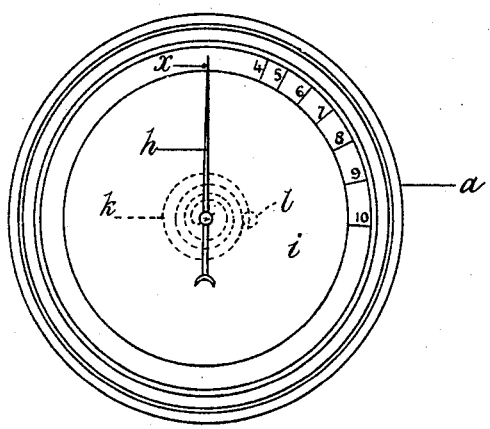
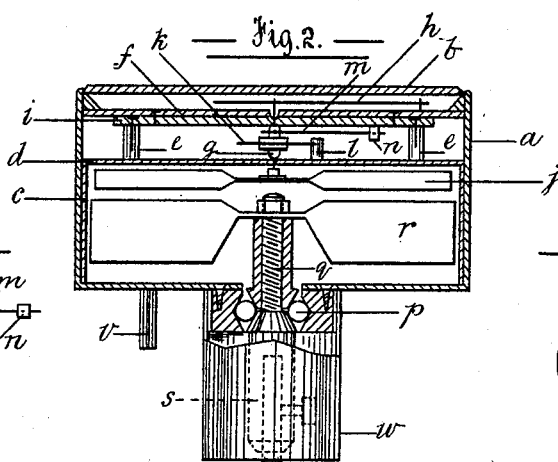
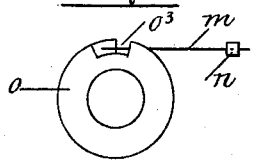
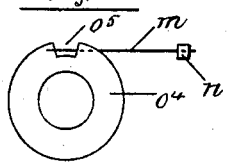
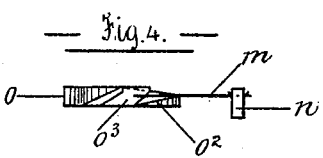
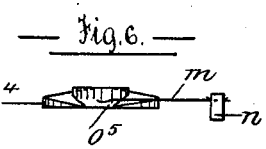
Witnesses:—
William Crossley
Harry Frank Parker
Inventor
Robert Goodlad
per Hughes Young
Attorneys.

UNITED STATES PATENT OFFICE.

ROBERT GOODLAD, OF SOUTHSEA, ENGLAND.

SPEED-INDICATOR.

SPECIFICATION forming part of Letters Patent No. 682,929, dated September 17, 1901.

Application filed May 10, 1901. Serial No. 59,687. (No model.)

*To all whom it may concern:*

Be it known that I, ROBERT GOODLAD, a subject of the King of Great Britain and Ireland, residing at 20 Sydney Terrace, Beach road, Southsea, in the county of Hants, in that part of the United Kingdom called England, have invented new and useful Improvements in Speed-Indicators, of which the following is a specification.

This invention relates to improvements in speed-indicators, the object being to provide an instrument of that kind of simple construction which shall show the speed attained and any variation therefrom.

In carrying my invention into effect I proceed in or in about the following manner, making reference to the accompanying drawings, in which—

Figure 1 is a front view, and Fig. 2 a section, of a complete apparatus, Figs. 3, 4, 5, and 6 being front views and plans of two forms of governor to be hereinafter referred to.

I provide an outer case $a$, having a glass front $b$, and an inner case $c$, the whole being made as air and dust proof as possible. The top $d$ of the inner case $c$ has pillars $e$, carrying the bridge $f$, through which and the top $d$ pass the pivots of the arbor $g$, one of which carries the pointer $h$, above the dial $i$, attached to the bridge $f$, and the other one a fan $j$. The arbor $g$ is encircled by the hair-spring $k$, one end of which is attached to the said arbor and the other end to the stud $l$ on the lid $d$.

In connection with this indicator I employ a governing-spring $m$, the free end of which presses on the arbor $g$, the other end being attached to the stud $n$. This governing-spring is to steady the pointer $h$ when the indicator is subjected to much vibration or jarring when running over rough roads or attached to shaky machinery. Instead of the spring $m$ pressing on the arbor $g$ it may press on a disk, such as $o$, (see Figs. 3 and 4,) which has a helicoidal slope on one face, as shown at $o^2$, this disk having also a gap $o^3$ at that part of its periphery corresponding to the zero of the dial $i$. The disk $o$ fits tightly on the arbor and is pressed home against a shoulder, which extends some little way above the hair-spring collet.

At the bottom of the outer case $a$ are ball-bearings $p$, in which runs the spindle $q$ of the driving-fan $r$. A socket $s$ is provided for coupling the spindle $q$ to the spindle $t$, which receives motion to set the indicator in operation. The spindle $t$ is rotated by any convenient means suitable to the purpose for which the indicator is used. For instance, if the indicator is to be used with a cycle or other wheel I provide the spindle $t$ with a roller $u$, which runs in contact with the rim of the wheel, the case of the indicator having a pillar $v$, by which it can be clipped or otherwise attached to some convenient part of the vehicle. Again, by substituting a fan for the roller $u$ the appliance can be used as an anemometer or other instrument for indicating the speed of air or fluid currents. Also by pressing the end of the spindle against the end of a revolving shaft the speed of the shaft can be ascertained, as also the regularity of its running. The bearings $p$ and the connecting arrangements $s$ are covered in by a dust-cap $w$. If the indicator is only to be used for motion in one direction, a stop $x$ may be provided at zero to prevent the pointer $h$ going back too far. When, however, the indicator is employed for motion in more than one direction, I dispense with the stop $x$ and have a second series of numerals or words reading in the opposite direction. In this case the governing-spring $m$ presses on a disk, such as $o^4$, (see Figs. 5 and 6,) which is sloped upward from the zero-gap $o^5$ in both directions till it attains its greatest thickness at a point diametrically opposite to the gap.

The dials of the indicators are graduated by trial, and there is sufficient uniformity in hair-springs to allow of one trial serving for the graduating of a large number of dials.

As a recording-anemometer the pointer $h$ may be extended in length and move over a clockwork-rotated suitably-arranged card.

What I claim as my invention, and desire to secure by Letters Patent, is—

In speed-indicators operated by a driving-fan rotated by the force or motion of which the speed is to be ascertained and wherein the readings are controlled by a spiral spring surrounding the arbor of the pointer, a governor consisting of a disk having its axis coincident with the axis of the arbor and having a helicoidal face on which presses the free end of a spring one end of which is attached to a suitable stud, the said disk having also a gap at a part of its periphery corresponding with that of zero on the dial substantially as described.

In testimony whereof I have signed my name to this specification in the presence of two subscribing witnesses.

ROBERT GOODLAD.

Witnesses:
JOHN CROMWELL COSENS PRIOR,
WILLIAM J. ROACH.